(12) United States Patent
Wichmann et al.

(10) Patent No.: US 7,548,957 B1
(45) Date of Patent: *Jun. 16, 2009

(54) METHOD AND MECHANISM FOR A PORTAL WEBSITE ARCHITECTURE

(75) Inventors: Derek Wichmann, Redwood City, CA (US); Ling Lam, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 10/141,583

(22) Filed: May 7, 2002

(51) Int. Cl.
*G06F 15/16* (2006.01)

(52) U.S. Cl. .................. 709/217; 709/218; 709/219; 709/226; 709/229; 707/4

(58) Field of Classification Search ........... 709/217, 709/225, 226, 229, 227, 204, 219; 707/1, 707/4; 706/12, 14, 61
See application file for complete search history.

(56) References Cited

U.S. PATENT DOCUMENTS

| | | | |
|---|---|---|---|
| 4,817,043 A | 3/1989 | Brown | |
| 4,974,170 A | 11/1990 | Bouve et al. | |
| 5,237,157 A | 8/1993 | Kaplan | |
| 5,649,186 A | 7/1997 | Ferguson | |
| 5,764,226 A | 6/1998 | Consolatti et al. | |
| 5,765,142 A | 6/1998 | Allred et al. | |
| 5,826,267 A | 10/1998 | McMillan | |
| 5,897,649 A | 4/1999 | Kennedy | |
| 5,983,227 A | 11/1999 | Nazem et al. | |
| 5,991,735 A * | 11/1999 | Gerace ................. | 705/10 |
| 6,014,137 A | 1/2000 | Burns | |
| 6,026,433 A | 2/2000 | D'Arlach et al. | |
| 6,029,182 A | 2/2000 | Nehab et al. | |
| 6,144,991 A * | 11/2000 | England ................ | 709/205 |
| 6,230,196 B1 | 5/2001 | Guenthner et al. | |
| 6,275,833 B1 | 8/2001 | Nakamura et al. | |
| 6,302,698 B1 | 10/2001 | Ziv-El | |
| 6,327,628 B1 | 12/2001 | Anuff et al. | |
| 6,341,310 B1 | 1/2002 | Leshem et al. | |
| 6,424,979 B1 * | 7/2002 | Livingston et al. ....... | 715/511 |
| 6,460,040 B1 | 10/2002 | Burns | |

(Continued)

OTHER PUBLICATIONS

Oracle Corporation "Oracle9i AS Portal Developer Kit (PDK)" http://portalstudio.oracle.com/pts/ops/docs/folder/community/pdk/articles/overview.portlets.html (Oct. 31, 2001) pp. 1-6.

(Continued)

*Primary Examiner*—Liangche A Wang
(74) *Attorney, Agent, or Firm*—Vista IP Law Group LLP

(57) ABSTRACT

A method and mechanism for portal web site architecture supporting a plurality of portlets, which are configurable content area displayable on a web page that provides content or performs one or more associated functions or both. Web providers provide the functionality and house the content for portlets. In response to receiving a request for a web page with a portlet, an application server contacts a web provider to obtain the content for the portlet, and assembles the web page using the retrieved content from the web provider and information stored in a database about the structure, appearance, and operation of the web page. Discussion forum portlets, notice board portlets, and memo pad portlets may be used to provide discussion forum functionality, notice board functionality, and memo pad functionality respectively.

19 Claims, 19 Drawing Sheets

U.S. PATENT DOCUMENTS

| | | |
|---|---|---|
| 6,487,552 B1 | 11/2002 | Lei et al. |
| 6,556,975 B1* | 4/2003 | Wittsche ..................... 705/26 |
| 6,587,668 B1* | 7/2003 | Miller et al. ................ 434/350 |
| 6,591,288 B1* | 7/2003 | Edwards et al. ............ 709/203 |
| 6,643,661 B2 | 11/2003 | Polizzi et al. |
| 6,684,369 B1 | 1/2004 | Bernardo et al. |
| 6,701,314 B1 | 3/2004 | Conover et al. |
| 6,701,343 B1 | 3/2004 | Kenyon |
| 6,745,238 B1 | 6/2004 | Giljum et al. |
| 6,760,916 B2 | 7/2004 | Holtz et al. |
| 6,766,362 B1 | 7/2004 | Miyasaka et al. |
| 6,842,767 B1 | 1/2005 | Partovi et al. |
| 6,871,197 B1* | 3/2005 | Johnson ...................... 706/61 |
| 6,871,216 B2* | 3/2005 | Miller et al. ................ 709/206 |
| 6,907,401 B1 | 6/2005 | Vittal et al. |
| 6,928,610 B2 | 8/2005 | Brintzenhofe et al. |
| 7,089,278 B1* | 8/2006 | Churchill et al. ............ 709/203 |
| 7,133,892 B2* | 11/2006 | Khan et al. .................. 709/203 |
| 7,277,924 B1 | 10/2007 | Wichmann et al. |
| 2001/0025309 A1 | 9/2001 | Beck et al. |
| 2001/0034609 A1* | 10/2001 | Dovolis ........................ 705/1 |
| 2001/0034771 A1 | 10/2001 | Hutsch et al. |
| 2001/0056398 A1 | 12/2001 | Scheirer |
| 2002/0001649 A1 | 1/2002 | Lowry et al. |
| 2002/0010709 A1 | 1/2002 | Culbert et al. |
| 2002/0030741 A1 | 3/2002 | Broemmelsiek |
| 2002/0036950 A1 | 3/2002 | Cosman et al. |
| 2002/0049727 A1* | 4/2002 | Rothkopf ....................... 707/1 |
| 2002/0065802 A1 | 5/2002 | Uchiyama |
| 2002/0069083 A1 | 6/2002 | Harter et al. |
| 2002/0073125 A1 | 6/2002 | Bier |
| 2002/0078140 A1 | 6/2002 | Kelly et al. |
| 2002/0095312 A1 | 7/2002 | Wheat |
| 2002/0095368 A1* | 7/2002 | Tran ............................ 705/37 |
| 2002/0103777 A1 | 8/2002 | Zhang |
| 2002/0103822 A1 | 8/2002 | Miller |
| 2002/0112155 A1 | 8/2002 | Martherus et al. |
| 2002/0123957 A1 | 9/2002 | Notarius et al. |
| 2002/0133250 A1 | 9/2002 | Kopcha |
| 2002/0152279 A1* | 10/2002 | Sollenberger et al. ....... 709/217 |
| 2002/0165960 A1 | 11/2002 | Chan |
| 2002/0178031 A1 | 11/2002 | Sorensen et al. |
| 2002/0194267 A1 | 12/2002 | Flesner et al. |
| 2003/0009537 A1 | 1/2003 | Wang |
| 2003/0069940 A1 | 4/2003 | Kavacheri et al. |
| 2003/0074580 A1 | 4/2003 | Knouse et al. |
| 2003/0084343 A1 | 5/2003 | Ramachandran et al. |
| 2003/0113699 A1 | 6/2003 | Johnson et al. |
| 2003/0115292 A1 | 6/2003 | Griffin et al. |
| 2003/0126558 A1 | 7/2003 | Griffin |
| 2003/0135393 A1 | 7/2003 | Burgess |
| 2003/0140120 A1 | 7/2003 | Hartman |
| 2003/0145275 A1 | 7/2003 | Qian et al. |
| 2003/0158508 A1 | 8/2003 | DiGianfilippo et al. |
| 2003/0187998 A1 | 10/2003 | Petit |
| 2003/0191879 A1 | 10/2003 | Marmash |
| 2004/0015476 A1 | 1/2004 | Twaddle |
| 2004/0044627 A1 | 3/2004 | Russell et al. |
| 2004/0068477 A1 | 4/2004 | Gilmour et al. |
| 2004/0205555 A1* | 10/2004 | Hind et al. ................... 715/513 |
| 2004/0217985 A9 | 11/2004 | Ries et al. |
| 2004/0225672 A1 | 11/2004 | Landers et al. |
| 2004/0254860 A1 | 12/2004 | Wagner et al. |
| 2004/0254881 A1 | 12/2004 | Kumar et al. |
| 2005/0028081 A1 | 2/2005 | Arcuri et al. |
| 2005/0044423 A1 | 2/2005 | Mellmer et al. |
| 2005/0097180 A1 | 5/2005 | Abdelhak |
| 2005/0138554 A1 | 6/2005 | Bell et al. |
| 2005/0229101 A1 | 10/2005 | Matveyenko et al. |
| 2005/0256940 A1 | 11/2005 | Henderson et al. |
| 2006/0184443 A1* | 8/2006 | Erez et al. ..................... 705/37 |
| 2006/0271625 A1* | 11/2006 | Kordun ....................... 709/204 |

OTHER PUBLICATIONS

Oracle Corporation "Oracle9iAS Portal, Feature Overview" http://portalstudio.oracle.com/pls/ops/docs/folder/community/otn_content/mainpage/keyfeatures_benefits/portal_FOV.html (May 2002) pp. 1-7.

Oracle Corporation "Oracle Application Server 10g, Oracle AS Portal" http://portalstudio.oracle.com/pls/ops/docs/folder/community/otn_content/mainpage/keyfeatures_benefits/portal_FOV_0.html (Sep. 2003) pp. 1-9.

Oracle Corporation "Oracle Application Server Portal Overview" (Sep. 2003) pp. 1-4.

Oracle Corporation "Creating and Managing Sites—Task Help" (Oct. 1999) pp. 111-197.

Oracle Corporation "Oracle8i™ Release 2 New Features Summary" (Nov. 1999) 17 pgs.

Oracle Corporation "Oracle Application Server Portal 10g (9.0.4) Product Overview, An Oracle White Paper" (Sep. 2003) pp. 1-9.

Oracle Corporation "Oracle9iAS Portal Release 2—Technical Overview; An Oracle White Paper" (Apr. 2002) pp. 1-30.

Oracle Corporation "Oracle9iAS Portal Release 2 (Version 9.0.2): New Features; An Oracle White Paper" (May 2002) pp. 1-34.

Guang, Y. et al. "Driving the Citizen-Oriented Information on the Electronic Highway" *Proceedings of the International Conference on Multimedia Computing and Systems*, Washington, D.C., USA (May 15-18, 1995), pp. 131-138.

Healy, P. "Wish You Were Here" *Which Computer?*(Aug. 1994) 17(8)40-41.

Holfelder, W. and D. Hehmann "Networked Multimedia Retrieval Management System for Distributed Kiosk Applications" *Proceedings of the International Conference on Multimedia Computing and Systems*, Boston, Massachusetts, USA (May 14-19, 1994) pp. 342-351.

Kearsley, G. and R.S. Heller, "Multimedia in Public Access Settings: Evaluation Issues" *J. Educational Multimedia and Hypermedia* (1995) 4(1):3-24.

Maloney, J.H. and R.B. Smith "Directness and Liveness in the Morphic User Interface Construction Environment" *Proceedings of the 1995 8th Annual Symposium on User Interface Software and Technology (UIST '95)*, Pittsburgh, Pennsylvania, USA (Nov. 14-17, 1995) pp. 21-28.

Martinez, C.D. "All That Jazz" *Presentations* (Jun. 1994) pp. 44-50.

Steiger, P. and B.A. Suter "Minnelli—Experiences with an Interactive Information Kiosk for Casual Users" *Computer Science Research at UBILAB—Stragegy and Projects*, W.R. Bischofberger, H.-P. Frei (eds.), *Proceedings of the UBILAB Conference '94*, Zurich, Switzerland (1994) pp. 124-133.

Office Action dated Sep. 29, 2005 for U.S. Appl. No. 10/141,485.

Notice of Allowance dated Dec. 8, 2006 for U.S. Appl. No. 10/141,485.

Notice of Allowance dated May 31, 2007 for U.S. Appl. No. 10/141,485.

Supplemental Notice of Allowance dated Aug. 30, 2007 for U.S. Appl. No. 10/141,485.

Office Action dated Mar. 1, 2005 for U.S. Appl. No. 10/152,972.
Office Action dated Aug. 8, 2005 for U.S. Appl. No. 10/152,972.
Office Action dated Feb. 24, 2006 for U.S. Appl. No. 10/152,972.
Office Action dated Aug. 22, 2006 for U.S. Appl. No. 10/152,972.
Office Action dated Dec. 28, 2006 for U.S. Appl. No. 10/152,972.
Office Action dated Jun. 29, 2007 for U.S. Appl. No. 10/152,972.

* cited by examiner

400

WELCOME CHRISTOPHER
DISCUSSION FORUMS

HOME

CREATE NEW DISCUSSION FORUM
CATEGORY
SUB-CATEGORY
FORUM NAME

SAVE   RESET   CANCEL

WELCOME CHRISTOPHER
DISCUSSION FORUMS

HOME

CREATE NEW DISCUSSION FORUM
CATEGORY        GENERAL
SUB-CATEGORY    CURRENT EVENTS
FORUM NAME      CHRIS' DISCUSSION GROUP

SAVE   RESET   CANCEL

FIG. 4B

**WELCOME CHRISTOPHER
DISCUSSION FORUMS**

HOME

500 →

ENABLE/DISABLE FORUMS —510

TEST AREA

520 ⌐   530 ⌐

DISCUSSION FORUM ABOUT DESIGN    EDIT?  ENABLED?
- FRONT END INTERFACE     ✏  ☑
- BACK END INTERFACE     ✏  ☑

CURRENT NEWS
- WEATHER     ✏  ☑
- SPORTS     ✏  ☑
- ENTERTAINMENT     ✏  ☑

GENERAL

INFORMATION    EDIT?  ENABLED?
- SUGGESTIONS     ✏  ☑

CURRENT EVENTS
- CHRIS' DISCUSSION GROUP     ✏  ☑

NEW CATEGORY

SUB-CATEGORY    EDIT?  ENABLED?
- NEW FORUM 01     ✏  ☑

DEPARTMENT 10

BREAKING NEWS    EDIT?  ENABLED?
- HUMAN RESOURCES     ✏  ☑

[SAVE] [RESET] [CANCEL]
540    550    560

WELCOME CHRISTOPHER
DISCUSSION FORUMS

HOME

GENERAL>CURRENT EVENTS>CHRIS' DISCUSSION
GROUP>EDIT FORUM SETTINGS

FORUM ID: 106837

PASSWORD: [_____] ⟵ 610

ALIAS: [FORUM ADMINISTRATOR] ⟵ 620

IF YOU WISH TO MAKE THIS FORUM PRIVATE, ENTER A PASSWORD. USERS WILL NEED THE FORUM ID TO ENTER A PASSWORD TO ACCESS A PRIVATE FORUM. CHANGING THE PASSWORD WILL UNSUBSCRIBE ALL CURRENT MEMBERS. REMOVING THE PASSWORD WILL MAKE THE FORUM PUBLIC.

MODERATORS AND MONITORS CAN POST USING AN ALIAS.

FAQ URL: [_____] ⟵ 630

▦ LINK TO AN FAQ BUILT USING THE ORACLE ONLINE FAQ BUILDER BY CLICKING THE ICON ON THE LEFT, OR YOU MAY ENTER ANY PAGE URL THAT YOU WOULD LIKE DISPLAYED AS THE FAQ FOR THIS

DEFAULT TEXT: [_____] ⟵ 640

TEXT TO BE INSERTED WITH EVERY NEW POST.

MODERATOR(S): [_____] ⟵ 650

MODERATOR LIST (ENTER USERNAMES SEPARATED BY COMMAS). ONLY GLOBAL ADMINS CAN EDIT THE MODERATOR LIST.

MONITOR(S): [_____] ⟵ 660

MONITOR LIST (ENTER USERNAMES SEPARATED BY COMMAS). ONLY MODERATORS CAN EDIT THE LIST.

ANNOUNCEMENTS
BEGIN (DD-MON-YY)        END (DD-MON-YY)   TEXT
[05-MAR-00] ☐            [06-MAR-00] ☐     [TODAY'S TOPIC IS: WHAT DID YOU THINK OF THE PRESIDENT'S SPEECH LAST NIGHT?]
  ⟵ 670                    ⟵ 672              ⟵ 675

680 ⟶ [SAVE] [RESET] [CANCEL]

DISCUSSION FORUM VIEWER 700     710 — CUSTOMIZE    HOME

| TITLE | AUTHOR | LAST POST | REPLIES |
|---|---|---|---|
| GENERAL>CURRENT EVENTS>CHRIS' DISCUSSION GROUP | | POST NEW MESSAGE | |
| THIS DISCUSSION FORUM IS EMPTY, CLICK ON THE NEW MESSAGE LINK TO ADD A MESSAGE | | 720 | |

HOT TOPIC VIEWER     760 — CUSTOMIZE

| TITLE | AUTHOR | LAST POST | REPLIES |
|---|---|---|---|
| QUESTION RE: OPERATING SYSTEM PICK LIST | JOHN DOE | MAR 15, 2000 15:13 PT | 11 |
| REACTION TO RECENT ANNOUNCEMENT | GREG SMITH | MAR 15, 2000 11:27 PT | 15 |
| ADVICE ON IMPROVING PERFORMANCE | TRACY SNOW | MAR 15, 2000 15:48 PT | 7 |
| THE WINTER OLYMPICS | KELLY LEE | MAR 15, 2000 15:06 PT | 5 |
| TRIBAL COUNCIL CLUES | MIKE CHAN | MAR 19, 2000 10:44 PT | 5 |

TODAY'S TOPIC IS: WHAT DID YOU THINK OF THE PRESIDENT'S SPEECH LAST NIGHT?

GENERAL > CURRENT EVENTS > CHRIS' DISCUSSION GROUP > POST NEW TOPIC

AUTHOR: ⊙ CHRISTOPHER BLACK  
○ FORUM ADMINISTRATOR ⚬ ⎬ 810

SUBJECT: [_____] ⟵ 820

MESSAGE: [_____] ⟵ 830

840 ⟶ [SUBMIT] [RESET] [CANCEL]

FIG. 8

DISCUSSION FORUM VIEWER 700    CUSTOMIZE    HOME

| TITLE | AUTHOR | LAST POST | REPLIES |
|---|---|---|---|
| GENERAL > CURRENT EVENTS > CHRIS' DISCUSSION GROUP | | | POST NEW MESSAGE |
| BRAINSTORM ABOUT INCREASING PRODUCTIVITY IN THE NORTH EAST | CHRISTOPHER BLACK ✉ | MAR 5, 2000 11:21 PT | NEW |

710, 711, 712, 713

HOT TOPIC VIEWER    CUSTOMIZE

| TITLE | AUTHOR | LAST POST | REPLIES |
|---|---|---|---|
| QUESTION RE: OPERATING SYSTEM PICK LIST | JOHN DOE | MAR 15, 2000 15:13 PT | 11 |
| REACTION TO RECENT ANNOUNCEMENT | GREG SMITH | MAR 15, 2000 11:27 PT | 15 |
| ADVICE ON IMPROVING PERFORMANCE | TRACY SNOW | MAR 15, 2000 15:48 PT | 7 |
| THE WINTER OLYMPICS | KELLY LEE | MAR 15, 2000 15:06 PT | 5 |
| TRIBAL COUNCIL CLUES | MIKE CHAN | MAR 19, 2000 10:44 PT | 5 |

METHOD AND MECHANISM FOR A PORTAL WEBSITE ARCHITECTURE

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention generally relates to the field of portal websites.

BACKGROUND AND SUMMARY OF THE INVENTION

Generally, a web site is an arrangement of content, e.g., text, images, and sound, on a set of web pages configured for presentation over a computer network in a predetermined way. The content appearing on a web page is generally stored in a centralized location, such as, e.g., a database or a set of files, that is local to a web server. Requests for web pages, which are typically transmitted by web browsers via the HTTP protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money, and effort in obtaining, storing, and updating the web content has increased.

More recently, portal web sites have been used to deliver complex and diverse content over a computer network. A portal web site is a web site containing one or more portlets displayed on a web page. A portlet is a configurable content area displayable on a web page that provides content or performs one or more associated functions or both. Portlets may display content that is obtained from a source remotely to the web server. For example, a portal web site may use an arrangement of portlets to display web content on different subject areas. The web content for each of the subject areas need not be stored centrally to the web server, but rather may be stored in a plurality of locations geographically removed, but accessible to the portal web server. A portlet may be configured such that it may display the information it obtains to the web browser in a customized manner.

An existing problem with this approach is that developing portal web sites still requires a significant investment of time, money, and effort. This is due, in part, to the cost of supporting the hardware and software necessary to support a portal web site and the computer specialists required to manage the portal web site. Further, constructing a portal web site from scratch is a time and labor intensive process. These associated costs often prohibit those without significant resources from building or using a portal web site. Additionally, while collaborative functionality such as discussion forums and notice boards are desirable, current solutions often require client software to be installed and configured on personal computers associated with each user, adding to the cost and complexity in maintenance. Unfortunately, there is no current solution in the art to create and deploy portal web sites without incurring these costs.

Accordingly, the present invention provides an improved method for providing access to a discussion forum over a computer network. In an embodiment, the first step is to configure a web provider to support a discussion forum portlet. Thereafter, a request is received for a web page from a user. The web page may comprise the discussion forum portlet, and the discussion forum portlet may host at least one of the one or more discussion forums. Subsequently, content is obtained for the discussion forum portlet from the web provider. Next, the requested web page is assembled at a application server, wherein the application server retrieves information about the structure, appearance, and operation of the web page from a database and thereafter composes the web page with the information and the content from the web provider. Finally, the web page is transmitted to the user. Further details of aspects, objects, and advantages of the invention are described below in the detailed description, drawings, and claims.

BRIEF DESCRIPTION OF DRAWINGS(S)

The present invention is illustrated by way of example, and not by way of limitation, in the figures of the accompanying drawings and in which like reference numerals refer to similar elements and in which:

FIG. 4A is a graphical depiction of a 'create new discussion forum interface' 400 according to an embodiment of the invention;

FIG. 4B is a graphical depiction of a 'create new discussion forum interface' 400 with identifying information specified according to an embodiment of the invention;

FIG. 5 is a graphical depiction of a 'enable/disable interface' 500 according to an embodiment of the invention;

FIG. 6A is a graphical depiction of an 'edit settings' interface 600 according to an embodiment of the invention;

FIG. 6B is a graphical depiction of an 'edit settings' interface 600 configured such that a sample message may be posted for one day according to an embodiment of the invention;

FIG. 7A is a graphical depiction of a discussion forum portlet 700 according to an embodiment of the invention;

FIG. 7B is a graphical depiction of a 'discussion forum viewer settings interface' according to an embodiment of the invention;

FIG. 8 is a graphical depiction of a 'post communication' interface 800 according to an embodiment of the invention;

FIG. 9 is a graphical depiction of a discussion forum portlet 700 with a posted message 710 according to an embodiment of the invention;

FIGS. 11A and 11B are graphical depictions of a reply interface 1100 according to an embodiments of the invention;

FIG. 15 is a graphical depiction of a the notice board portlet 1300 with a posted notice according to an embodiment of the invention;

DETAILED DESCRIPTION OF EMBODIMENT(S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A user, as used within, refers to any person or computing entity that receives, views, or consumes content from the portal management system 100. In other words, a user may be a human being or a computer program. A group, as used herein, is a set of users who may be collectively assigned certain access permissions to portions of a portal web site. An administrator, as used herein, refers to any person that manages the operation of the portal management system 100. Content, or web content, refers to any information displayable on a web page, such as text, images, or sound files.

I. Functional Overview

Figure 1:
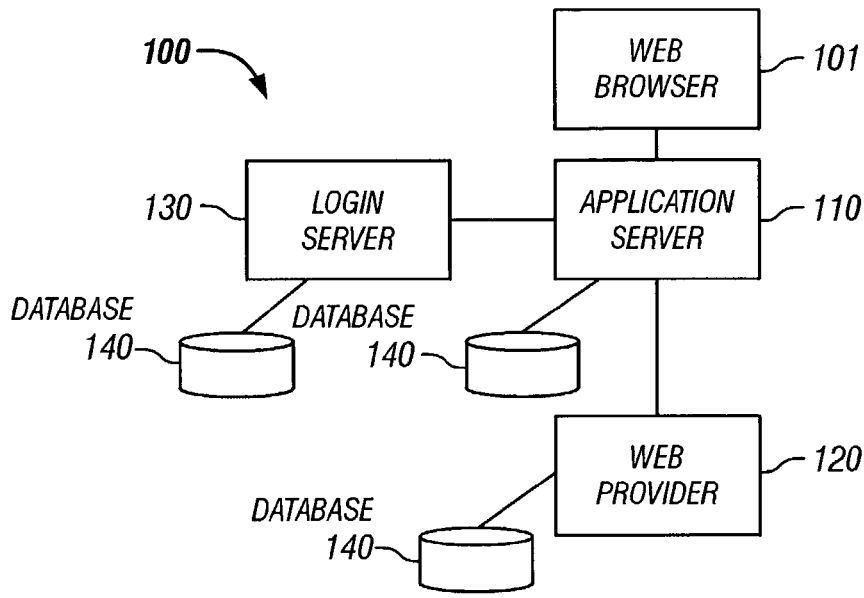
FIG. 1 is a pictorial representation illustrating the functional components of a portal management system 100 according to an embodiment of the invention.

FIG. 1 is a pictorial representation illustrating the functional components of a portal management system 100 according to an embodiment of the invention. According to an embodiment of the invention, the portal management system 100 allows a user to manage the appearance and operation of a web site and the content appearing thereon. The portal management system 100 includes a web browser 101, an application server 110, a database 140, and a web provider 120. In embodiments of the invention, the portal management system 100 may also include a login server 130.

A web browser 101 is any device capable of browsing content over a computer network, such as the Internet, and is operatively connected to the application server 110. While only one web browser 101 is shown in FIG. 1, multiple web browsers 101 may be operatively connected to the application server 110. The web browser 101 and the application server 110 may communicate over a computer network using well-known communication protocols, such as TCP/IP, HTTP, and XML. An application server 110 is a well-known component that assembles and serves web pages to one or more web browsers 101. As such, an application server 110 may serve web pages containing one or more portlets. A portlet is a configurable content area displayable on a web page that displays content obtained from a source remotely to the web server, or performs one or more functions remotely to the web server. A portlet may be configured such that it may display customized information to a user. In an embodiment, an application server 110 is implemented using the 9iApplication Server available from Oracle Corporation, located in Redwood Shores, Calif.

A web provider 120 is a functional component that provides content for a portlet in response to requests from the application server 110. A web provider 120 may, although it need not, be embodiment in software operating on a separate hardware device other than that executing the application server 110. In some embodiments, the web provider 120 may be implemented using a cross-platform component architecture, e.g., the JavaBean™ architecture from Sun Microsystems, Inc., located in Palo Alto, Calif. Such an embodiment is advantageous when deploying web providers 120 over multiple platforms.

A login server 130 is a software component which verifies and authorizes the identities of users. A user accessing the portal management system 100 may need to obtain authorization from the login server 130 prior to substantial use of the portal management system 100. In an embodiment, the user may obtain authorization from the login server 130 by transmitting information related to their identity to the application server 110, which is subsequently transmitted to the login server 130 for verification. Once a user is authenticated by the login server 130, a user identifier, which is information that uniquely identifies the user, may be assigned by the login server 130. The user identifier may accompany all transmissions from the user. As the identity of the user may be ascertained from his transmissions by his user identifier, the state of the portal management system 100 for that user may be preserved. For example, in an embodiment, as the state of the portal management system 100 is preserved for each user, a home page or default configuration for a user may, by default, be initially displayed by the application server 110. In an embodiment, the login server 130 may be implemented using the Single Sign-on Server, available from Oracle Corporation, located in Redwood Shores, Calif.

In embodiments of the invention, the application server 110, web provider 120, and the login server 130 may each be operatively connected to one or more databases 140 to enable the application server 110, web provider 120, and the login server 130 to store, manage, and retrieve data. A database is a software component for storing, managing, and retrieving data, and includes the plurality of databases known to those in the art, such as, e.g., the Oracle 8idatabase, available from Oracle Corporation, located in Redwood Shores, Calif. While those skilled in the art recognize that data stored in a single database may be stored across multiple database, and vice-versa, for ease of explanation the present invention shall be described such that the application server 110, web provider 120, and login server 130 are operatively connected to individual databases. However, the present invention is not limited to any particular arrangement of databases. Embodiments of the invention include the use of backup or failover databases or disc arrangements, such as in a RAID arrangement, to promote uninterrupted operability of the database.

In embodiments of the invention, the database 140 stores information about groups of related users in different database schemas. In other embodiments, the database 140 stores information about related groups of users using the same database schema. Access is restricted in the database schema such that users may only access information pertinent to their associated group. In some embodiments, this is performed using a virtual private database ("VPD"), which is a feature of the Oracle 8idatabase available from Oracle Corporation, located in Redwood Shores, Calif. This feature is described in patent application Ser. No. 09/167,092, filed on Oct. 5, 1998, and in patent application Ser. No. 09/812,896, filed on May 31, 2001, each of which are assigned to the assignee of the present application and each are hereby incorporated herein by reference. Other embodiments of the invention may perform the function of restricting access to rows in a database table by user through a variety of other methods, such as, e.g., using a database view or the use of a session table. In order to prevent unnecessarily obscuring the description of the present invention, embodiments of the invention shall store information about multiple users of the portal management system 100 in the same schema in the database, but will restrict access such that a user may only access information stored in the database 140 authorized to that user. Embodiments of the invention may use any of the aforementioned mechanisms to restrict access on the database schema by, for example, associating a subscriber identifier with each user. A subscriber identifier is a unique identifier for a set of users. For example, a company may be assigned the same subscriber identifier. All users of the company in the example may have a different user identifier, but may have the same subscriber identifier. By associating a subscriber identifier with each user, access to a database 140 may be restricted using the techniques discussed above.

For the sake of clarity and brevity, only one application server 110, web provider 120, and login server 130 are depicted. Those skilled in the art shall recognize that for a variety of reasons, including scalability and performance, multiple application servers 110, web providers 120, and login servers 130 may be used. Accordingly, the invention is not limited to any particular number or arrangement of functional components, such as applications servers 110, web providers 120, and login servers 130 within the portal management system 100.

Figure 2:
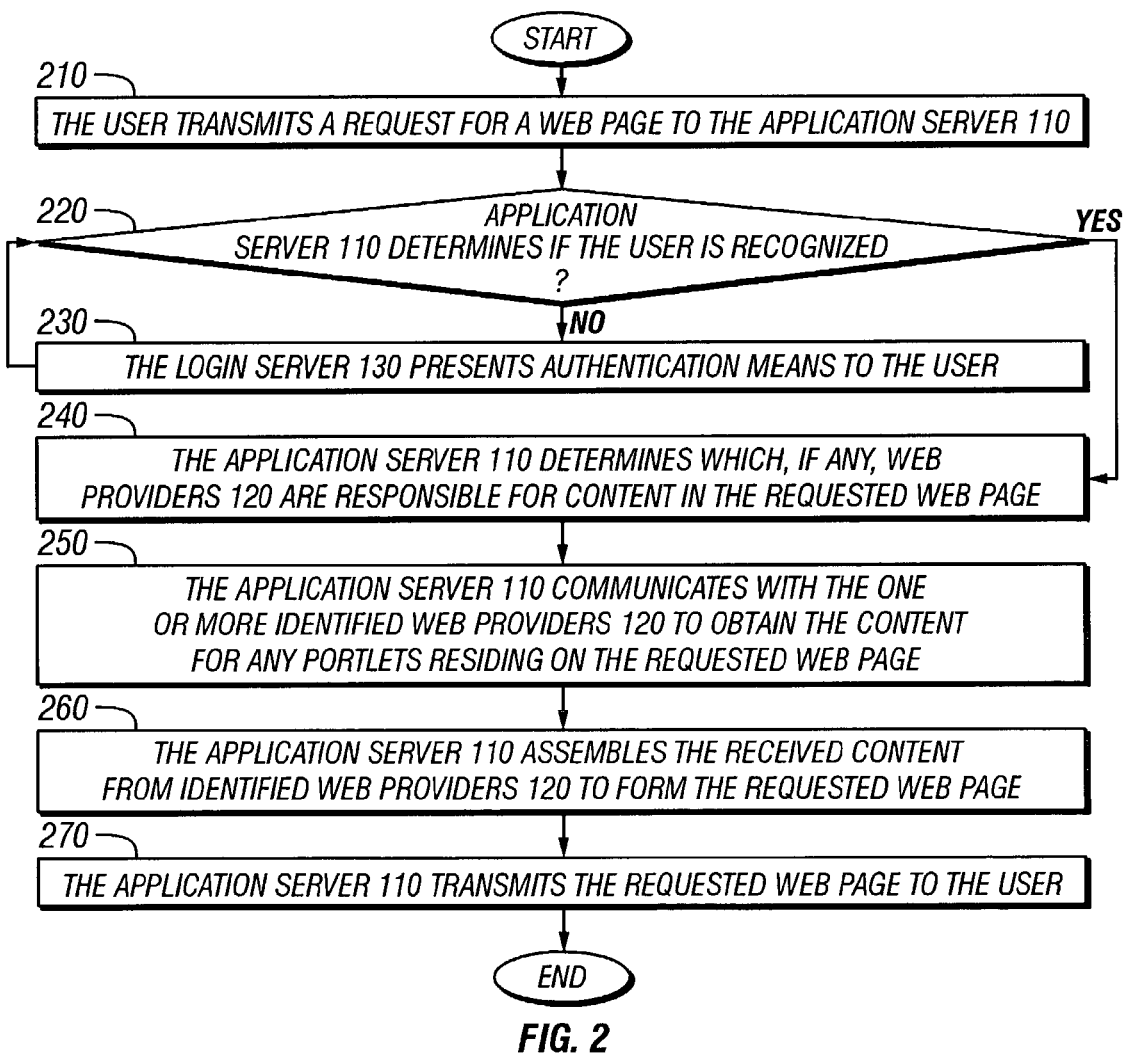
FIG. 2 is a flow chart illustrating the steps in the operational flow of requesting content through the portal management system 100 according to an embodiment of the invention.

The operational flow of requesting content through the portal management system 100 will be presented with reference to FIG. 2, which is a flow chart illustrating the same according to an embodiment of the invention. In an embodiment, initially, in step 210, the user transmits a request for a web page to the application server 110. The request may be sent by the user through a web browser 101 associated with the user. Subsequently, the application server 110 determines in step 220 if the user is recognized (i.e., "logged in"). This may be accomplished by examining an associated user identifier accompanying the user request. If the user is not recognized by the application server 110, then the application server 110 may provide authentication means to the user so that the user may authenticate him or herself in step 230. Such means may include a web page where the user may submit information regarding their identity, such as a username and password. Subsequently, the identifying information may be transmitted by the application server 110 to the login server 130 for verification. The login server 130 may, upon receiving the identifying information, verify the user's identity with information stored about the user in a database associated with the login server 130. Thereafter, the login server 130 may transmit the results of the verification to the application server 110. In embodiments, the user may be given a predetermined number of opportunities to authenticate him or herself before the portal management system 100 disables the user's account within the portal management system 100. If the user is recognized by the application server 110, then operation proceeds to step 240.

In an embodiment, in step 240, the application server 110 determines which, if any, web providers 120 are responsible for content in the requested web page. For example, if a requested web page has two portlets displayed on it, each web provider 120 that supports one of the two portlets on that requested web page may be identified. In an embodiment, after determining which web providers 120 are responsible for content, the application server 110 communicates with the one or more identified web providers 120 to obtain content for any portlets residing on the requested web page in step 250. Upon receiving the request, the web providers 120 parse the request, fulfill the request, and transmit the information satisfying the request to the application server 110. For example, a web provider 120 may provide functionality regarding formula management. If a request is received by that web provider 120 to retrieve a particular formula, then the web provider fulfills the request by retrieving the requested formula, and transmitting the formula to the application server 110. This example is described in further detail in U.S. patent application Ser. No. 10/071,260, filed on Feb. 7, 2002, assigned to Oracle Corporation of Redwood Shores, Calif., which is incorporated herein by reference in its entirety.

In an embodiment, subsequently, the application server 110 assembles the received content from the identified web providers 120 to form the requested web page 260. As discussed in further detailed below, the application server 110 assembles the content to form the requested web page by merging data received from web providers 120 and data stored in an associated central repository concerning the organization and presentation of the web page. Thereafter, in an embodiment, the application server 110 transmits the requested web page to the user in step 270. The user typically receives and renders the requested web page in an associated web browser 101. The process depicted in FIG. 2 may be repeated if the user requests an additional web page. In an embodiment, the application server 110 may periodically transmit updated information about a particular portlet to a web browser 101 without receiving an explicit user request to do so, if the application server 110 previously transmitted information to the web browser 101 about that portlet, and the application server 110 received notification that a more current set of information for that portlet is available. For example, if a user loaded a world news portlet in their web browser 101, the world news displayed in the portlet may be updated by the application server 110 when notification is received by the application server 110 that updated-information becomes available. Such notification regarding the relative freshness of the data may be stored in the application server 110, or may be received periodically from the web provider 120.

II. Assembling Content at Portal Web Server

In an embodiment, the application server 110 stores information regarding the composition of a web page in a central repository, such as a database. Aspects of the invention directed towards storing information in a central repository are detailed in U.S. patent application Ser. No. 09/540,092, filed on Mar. 31, 2000, U.S. patent application Ser. No. 09/540,977, filed on Mar. 31, 2000, both of which are assigned to the assignee of the present invention and both of which are incorporated herein by reference.

The application server 110 assembles the requested web page using any content received from web providers 120 and data stored in an associated central repository concerning the organization and presentation of the web page. In an embodiment, the data stored in the central repository that the application server 110 uses in assembling the requested web page includes data concerning the following attributes of the web page: style, layout, content resident thereon, portlets displayed thereon, items displayed thereon, groups, folders, and user permissions for the web page. In other words, the application server 110 manages data concerning the appearance and operation of portal web sites in a central repository, such as a database, and uses that information to assemble the web page, along with content received from web providers 120. The data the application server 110 uses in rendering web pages may be directed towards visual aspects of the page, e.g., style or layout information, or it may be directed towards operational aspects of the page, e.g., what portlets are displayed, permissions regarding access to portions of the web page. Accordingly, in an embodiment, the application server 110 manages user permissions regarding the content displayed on the portal web site. Said differently, users may be assigned permission levels to restrict their access to content at multiple levels of granularity, e.g., web pages, folders, portlets, and individual items on a web page.

In embodiments of the invention, web pages are dynamically generated based upon data stored in tables in a database. In some embodiments, the structure of the web page, the content of the web page, and the permissions to access portions of the web page, are all stored in tables in a database, e.g, the database coupled to the application server 110. As the permissions, structure, and content all reside in a database, and the layout of the web page is dynamically generated, the layout and the permissions to access any portion of the web page may be defined to any level of granularity. In other words, as information about the web site is stored in tables, and the web site is dynamically rendered from the tables, the layout or permissions may be arbitrarily complex to accommodate any desired layout or permission level. If a new layout or permission level is desired, then it may be defined in the database to be applied by the application server 110.

III. Discussion Forum Portlet

According to embodiments of the invention, the portal management system 100 supports a plurality of portlets with diverse functionality. In an embodiment of the invention, the portal management system 100 supports one or more portlets that facilitate discussion forums. A discussion forum portlet 700 is a portlet that enables one to communicate and share ideas with others while making the communication publicly available. As such, a discussion forum portlet 700 advantageously allows one to collaborate and share ideas, thoughts, and comments with others through one or more discussion forums hosted by the discussion forum portlet 700.

Figure 3:
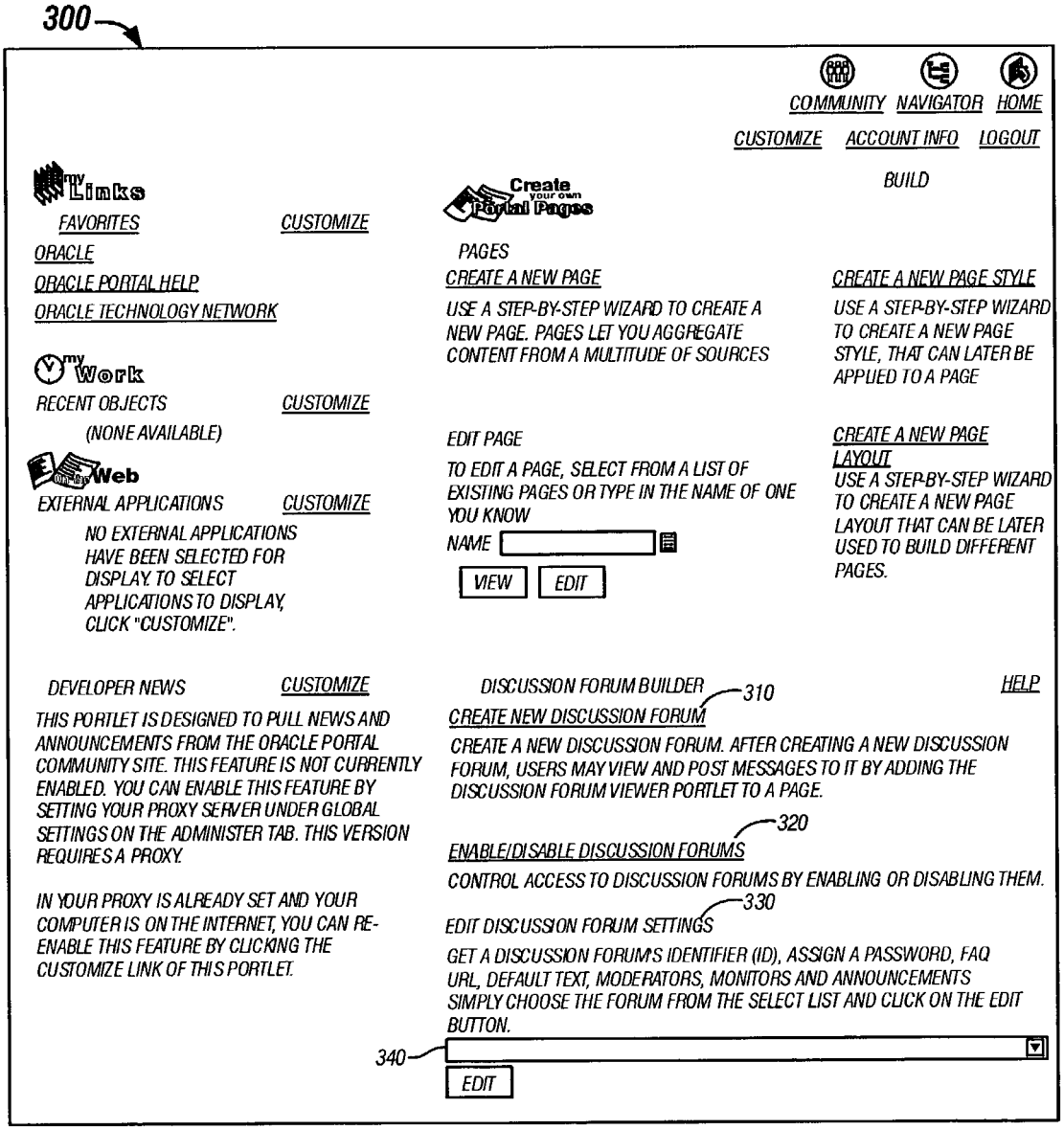
FIG. 3 is a graphical depiction of an admin discussion forum portlet 300 according to an embodiment of the invention.

In an embodiment of the invention, the portal management system 100 comprises an admin discussion forum portlet 300, such as the one depicted in FIG. 3. An admin discussion forum portlet 300 allows an administrator to create and manage discussion forum portlets 700. In the admin discussion forum portlet 300 shown in FIG. 3, by clicking the 'create new discussion forum' link 310, the 'create new discussion forum interface' 400 is displayed, such as the one shown in FIG. 4A. The 'create new discussion forum interface' 400 allows one to specify identifying information about the new discussion forum portlet 700. In the embodiment shown in FIG. 4A, the category, sub-category, and forum name of the new discussion forum may be specified by entering in the information in the appropriate field, and subsequently selecting the 'save' button. FIG. 4B depicts a 'create new discussion forum interface' 400 with identifying information specified. Alternately, the 'reset' button may be selected to reset the fields, or the cancel button may be selected to return to the prior screen. Icons presented to the right of the fields may present a list from which values may be selected from.

Returning to FIG. 3, in an embodiment, by selecting the 'enable/disable' discussion forum' link 320, an 'enable/disable interface' 500 is presented to the administrator. An 'enable/disable interface' 500 presents a list of created discussion forums 510. In an embodiment of the 'enable/disable interface' 500, such as the one shown in FIG. 5, the list of created discussion forums 510 may be sorted by the identifying information. In embodiments, the 'enable/disable interface' 500 associates to each discussion forum portlet 700 an edit icon 520 and an enable box 530. The edit icon 520 presents a 'edit settings' interface 600 when it is selected, while the enable box 530 determines if the particular discussion forum portlet 700 is enabled or not. A discussion forum portlet 700 may be visible to non-administrators (users who are not administrators) when it is enabled, a discussion forum portlet 700 may not be visible to non-administrators if it is disabled. In other words, only when a discussion forum portlet 700 is enabled may a user add the discussion forum portlet 700 to their portlet for display and subsequent access. Selections made in the enable boxes 530 may be saved using the save button 540, as well as reset and cancelled using the reset button 550 and the cancel button 560.

Figure 6A:
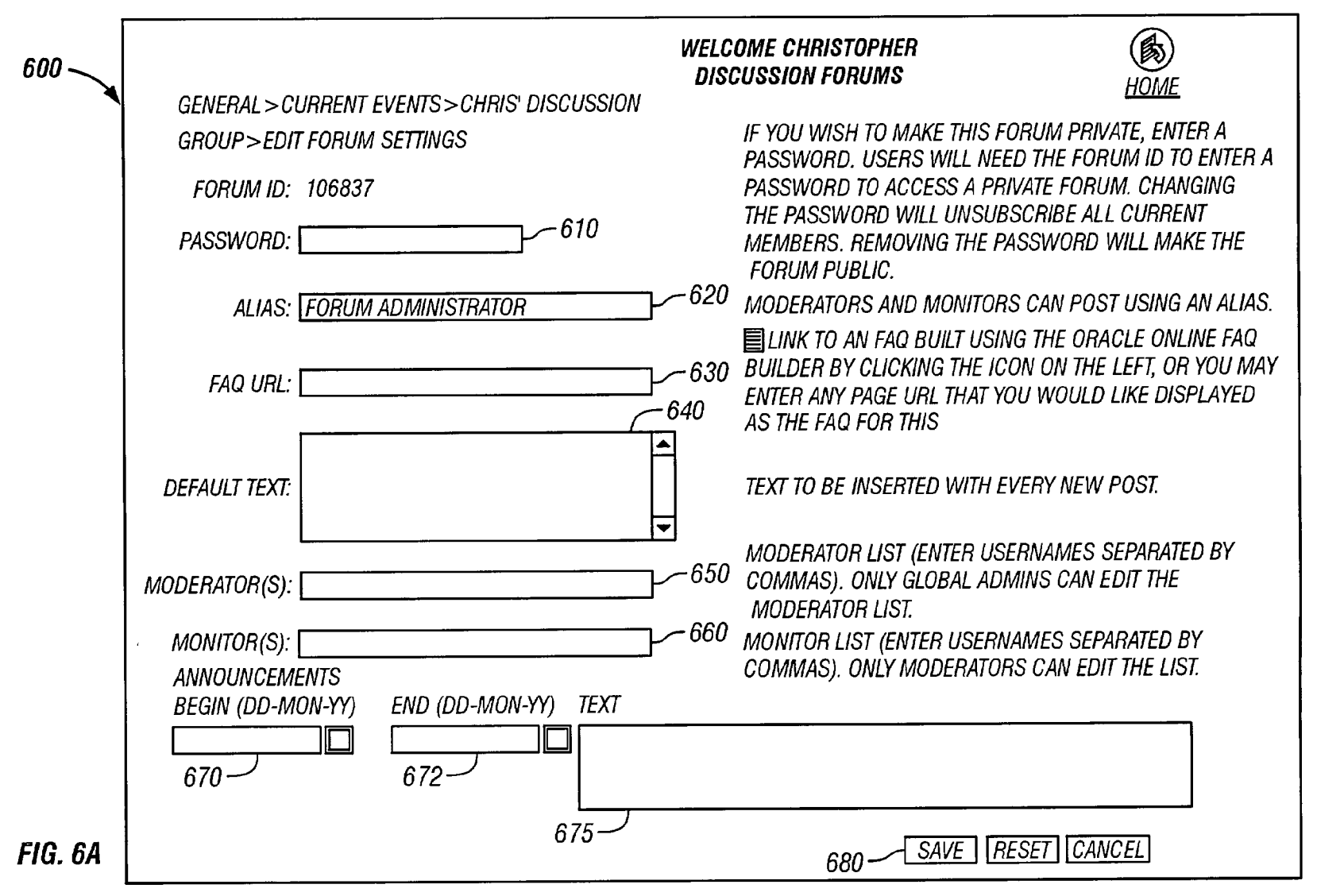

In the embodiment of the admin discussion forum portlet 300 shown in FIG. 3, by specifying a particular discussion forum portlet 700 in the portlet settings field 340 and then selecting the 'edit discussion forum settings' link 330, the 'edit settings' interface 600 is presented to the administrator. FIG. 6A is a graphical depiction of an 'edit settings' interface 600 according to an embodiment of the invention. An 'edit settings' interface 600 is an interface that allows the administrator to configure a particular discussion forum portlet 700. The administrator may configure any characteristic of a discussion forum portlet 700. In the embodiment shown in FIG. 6A, the administrator may restrict access to the particular discussion forum portlet 700 to users who supply the specified password in the password field 610. Additionally, a moderator alias may be specified in the moderator alias field 620 to allow a moderator or a monitor, i.e., an administrator who monitors the flow of discussion, to post communications using the alias. A link to a FAQ may be specified in the FAQ URL field 630. Also, any text that the administrator wishes to be inserted in every new post may be entered in the default text field 640. Moderators and monitors may be specified for the particular discussion forum through the moderator list 650 and the monitor list 660. Announcements may also be posted in the particular discussion forum by specifying the appropriate information in the start date field 670, the end date field 672, and the announcement text field 675. Information may be saved, reset, or cancelled using the appropriate buttons 680. For example, FIG. 6B illustrates an 'edit settings' interface 600 configured such that a sample message may be posted for one day. As shown in FIG. 6B, the message may be saved and applied to the particular discussion forum by selecting the save button.

FIG. 7A is a graphical depiction of a discussion forum portlet 700 according to an embodiment of the invention. A discussion forum portlet 700 is a portlet that enables one to communicate and share ideas with others while making the communication publicly available. In embodiments, the discussion forum portlet 700 may host one or more discussion forums, and each discussion forum may have a plurality of message posted, with each posted message having a plurality of posted responses. In the embodiment shown in FIG. 7A, there is one discussion forum being hosted with no messages posted. The discussion forum portlet 700 may be customized by clicking the customize link 710. In an embodiment, the customize link 710 presents the 'discussion forum viewer settings interface' 740. An illustrative 'discussion forum viewer settings interface' 740 according to an embodiment is shown in FIG. 7B. As FIG. 7B graphically depicts, the particular discussion forum 700 may be configured to display one or more discussion forums, as well as how many messages to display in each forum.

In an embodiment, a message may be posted in the discussion forum portlet 700 by selecting the 'post new message' link 760, which presents the 'post communication' interface 800. An illustrative 'post communication' interface 800 according to an embodiment of the invention is shown in FIG. 8. The 'post communication' interface 800 may allow one to specify who the author of the communication is, e.g., by selecting one of the radio buttons 810. In one embodiment, users or administrators may be able to post messages anonymously. In other embodiments, only administrators or moderators may post anonymously. A subject to the message may be specified in the subject field 820, and the message itself may be specified in the message field 830. The buttons 840 allow one to submit, reset, and cancel the data entered into the 'post communication' interface 800. After a message is posted in the 'post communication' interface 800 by clicking the submit button, the message will appear in the appropriate discussion forum. Many users may have the same discussion forum displayed in a discussion forum portlet 700. Consequently, when a message is posted, it may be displayed in the discussion forum portlet 700 of every user who has configured his or her discussion forum portlet 700 to display the discussion forum associated with the posted message.

Figure 10A:
FIG. 10A is a graphical depiction of a 'post communication' interface 800 with the subject specified in the subject field 820 according to an embodiment of the invention.

FIG. 9 graphically depicts a discussion forum portlet 700 with a posted message 710 according to an embodiment of the invention. In the embodiment shown, the message subject is shown, along with the author 711, the date of the posting 712, and a graphic 713 indicating the message was posted within a specified time. A response to a particular posted message 710 may be posted by clicking on the posted message 710 to present the 'post communication' interface 800. As FIG. 10A shows, the 'post communication' interface 800, once displayed, may already have the subject specified in the subject field 820, although "re:" or similar notation may precede the subject to indicate that the current message is in response to another according to an embodiment of the invention.

Figure 10B:
FIG. 10B is a graphical depiction of a discussion forum portlet 700 according to an embodiment of the invention.
Figure 11A:
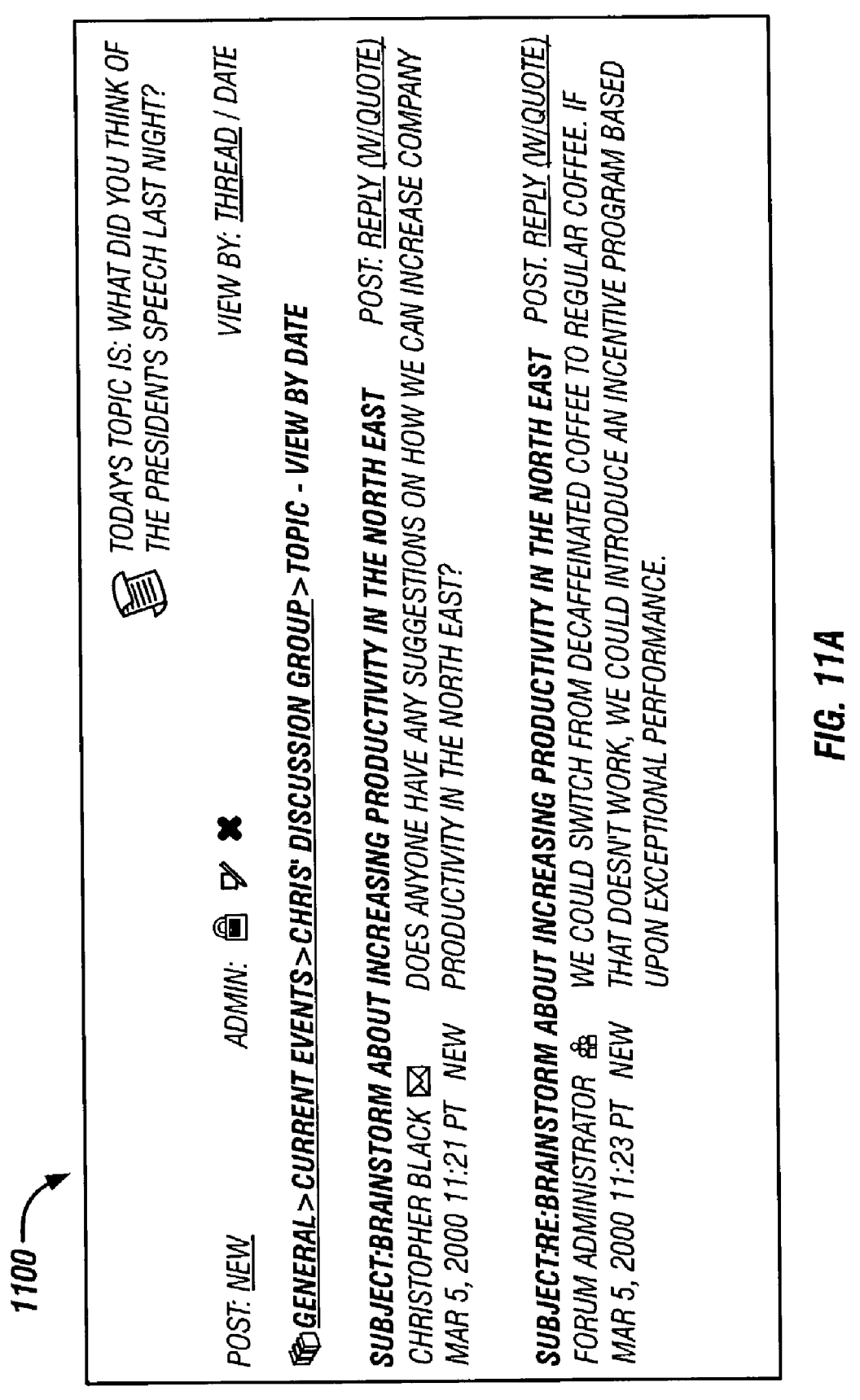
Figure 11B:

After the response is entered and submitted, the response is posted to all discussion forum portlets 700 that show the particular discussion forum to which the response is posted. Visual indicators, such as counters and graphical images, may be used to indicate that one or more responses have been posted to a particular message. For example, in the discussion forum portlet illustrated in FIG. 10B, a reply counter 714, which indicates how many replies are posted to a particular message, is displayed. In various embodiments, the reply counter 714 may only be visible when there are replies posted for a particular message. By clicking the particular posted message 710, the posted replies may be viewed using the reply interface 1100. An illustrative reply interface 1100 according to an embodiment of the invention is shown in FIGS. 11A and 11B. In various embodiments, the reply interface 1100 lists all the replies for a subject, and it may present the invention by a variety of manners selectable by the user, e.g., by date of posting (as shown in FIG. 11A) or by thread or subject (as shown in FIG. 11B).

Figure 12:
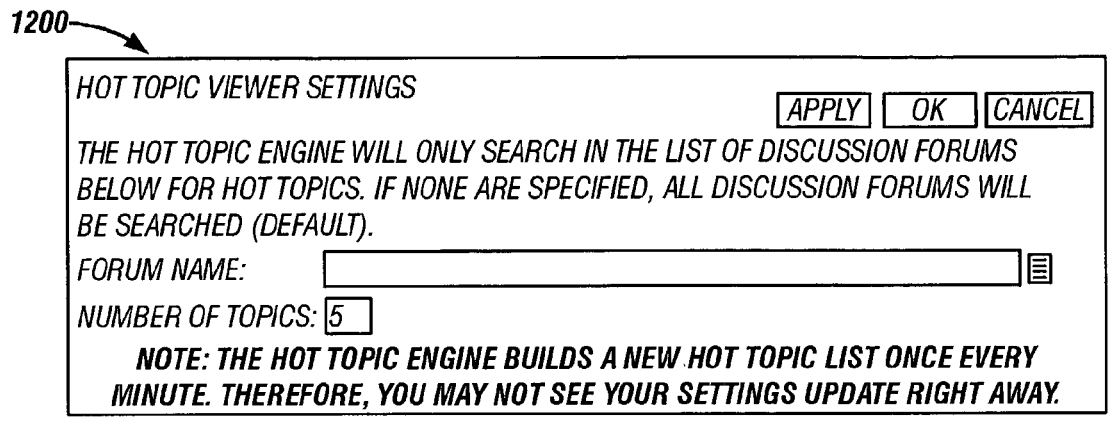
FIG. 12 is a graphical depiction of a 'hot topics settings' interface 1200 according to an embodiment of the invention.

A hot topics portlet 750 may also be employed by embodiments of the invention. A hot topics portlet 750 may display the messages with the most replies across all discussion forums. In embodiments, the hot topics portlet 750 may be configured such that it only displays messages from certain discussion forums. In some embodiments, both users and administrators may configure the hot topics portlet 750; configurations performed by the user using the hot topics portlet 750 may override the default configurations performed by the administrator. By selecting the 'hot topics configuration' link 760, the settings of the hot topics portlet 750 may be configured through an interface, such as the one shown in FIG. 12, according to an embodiment of the invention. Using the hot topics settings interface 1200 shown in FIG. 12, one may specify which discussion forums are searched by the hot topics portlet 750, as well as the number of hot topics to present to the user.

While the functionality of the portlet management system in supporting discussion forums have been discussed with reference to various interfaces and screens, it is contemplated by the inventors that the invention may be practiced by modifying the interfaces and screens without deviating from the spirit and scope of the invention. Accordingly, the invention is not limited to any specific combination or composition of interfaces and screens, as any reference to a specific interface or screen is merely for illustrative purposes.

IV. Notice Board Portlet

Figure 13:
FIG. 13 is a graphical depiction of a notice board portlet 1300 according to an embodiment of the invention.

In an embodiment of the invention, the portal management system 100 supports one or more portlets that facilitate notice boards. A notice board portlet 1300 is a portlet that allows one to publish communications, or notices, to a group. An illustrative notice board portlet 1300 according to an embodiment of the invention is shown in FIG. 13. As FIG. 13 shows, notices 1305 are displayed in the notice board portlet 1300. In embodiments, various information may accompany the notices 1305, such as, e.g., the date of posting, the name of the person posting the notice, the name of the recipient of the notice, and the subject of the notice. In embodiments, the list of notices may be sorted using a show list 1310, which displays the list of notices in a particular way, e.g., showing only the unread notices, or showing the notices in order of posting date. Clicking the refresh button 1320 may refresh the list of notices presented in the notice board portlet 1305. A new notice may be posted to the notice board portlet 1300 by clicking the new notice button 1330. Individual notices may be deleted by the delete notice field 1340 by specifying the particular notice (which may be aided by a pull down list or similar mechanism) and clicking the delete icon to the left of the delete notice field 1340. In some embodiments, a user may only delete notices based on certain criteria, such as, e.g., a user may only be able to delete notices that he or she has read or posted him or herself.

Figure 14:
FIG. 14 is a graphical depiction of a new notice screen according to an embodiment of the invention.

When the new notice button 1330 is selected, the new notice screen is displayed. An example of an illustrative new notice screen is depicted in FIG. 14. The new notice screen allows a user to specify information about the notice, such as, e.g., who the notice is for, who the notice is from, what the notice is regarding, and what the notice is. The notice may be posted to the notice board portlet 1300 by selecting the submit button, or cancelled by selecting the cancel button.

In embodiments, a notice that is posted may appear in the notice board portlet 1300. For example, if the notice shown in FIG. 14 is posted, then the notice board portlet 1300 will reflect the posted notice in the manner shown in FIG. 15 according to an embodiment of the invention. Specifically, the newly added notice appears as notice 1305D.

Figure 15:
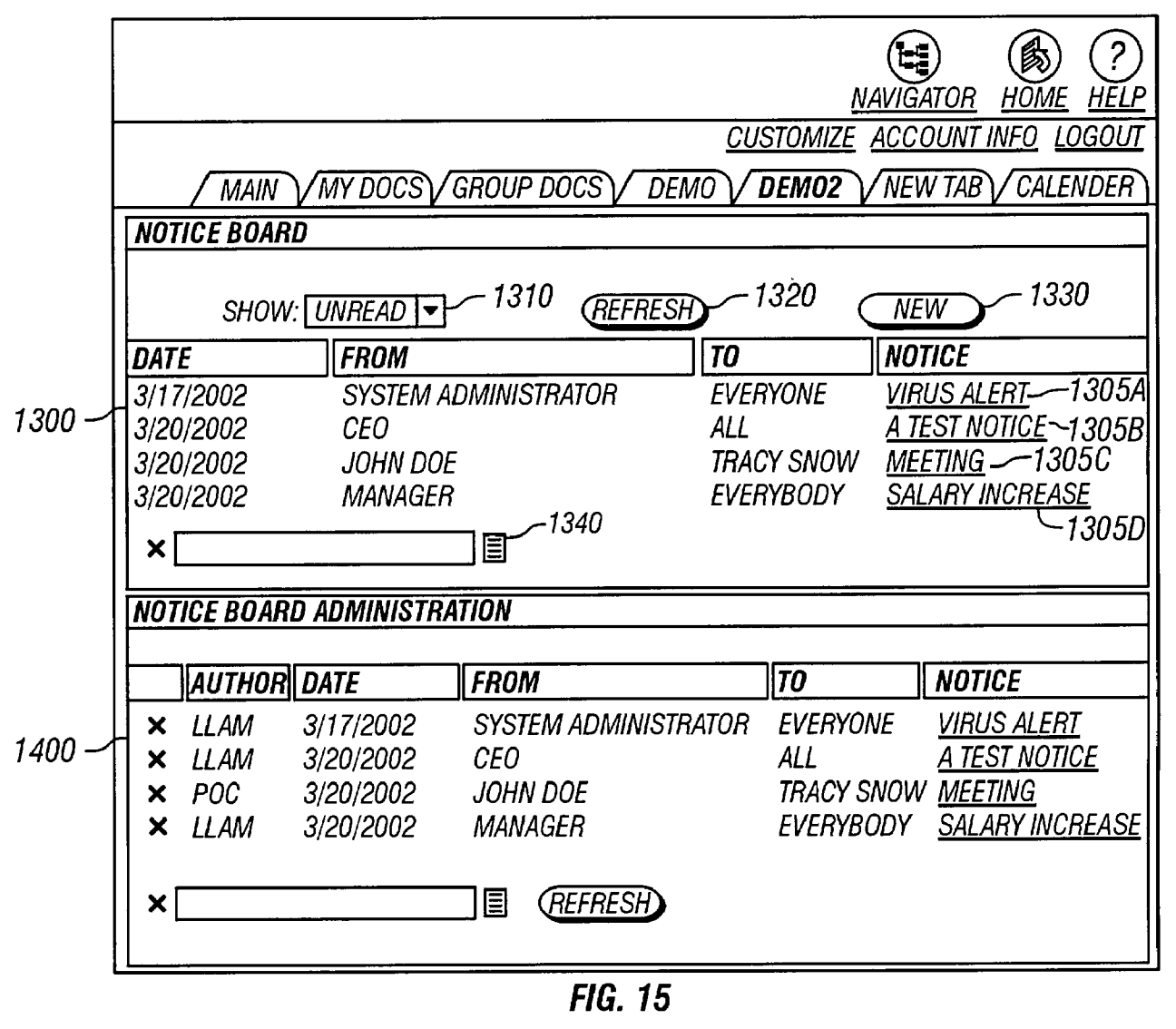

A notice board administration portlet 1400 may be used by an administrator to manage the notice board portlet 1300. An illustrative notice board administration portlet 1400 is shown in FIGS. 13-15. The notice board administration portlet 1400 allows the administrator to read and delete all notices posted.

V. Memo Pad Portlet

According to an embodiment of the invention, a memo pad portlet 1600 may be employed by the portal management system 100 to provide scrivener functionality to users. The memo pad portlet 1600 is a portlet that may be used by a user to record, store, retrieve, and view any document. An example of a memo pad portlet 1600 according to an embodiment of the invention is shown in FIG. 16.

Figure 16:
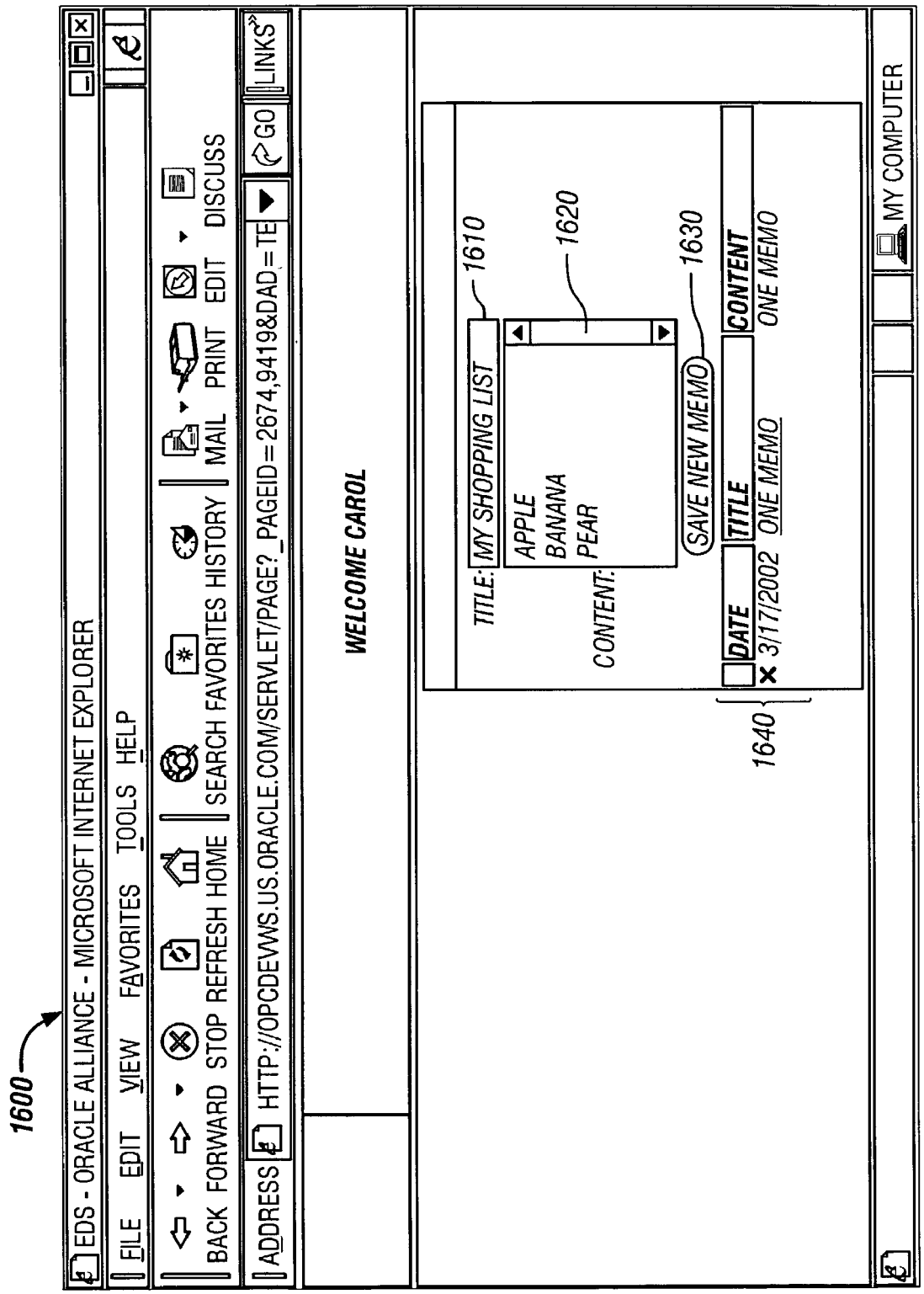
FIG. 16 is a graphical depiction of a memo pad portlet 1600 according to an embodiment of the invention.

FIG. 16 is a graphical depiction of a memo pad portlet 1600 according to an embodiment of the invention. As shown in FIG. 16, the memo pad portlet 1600 comprises a title screen 1610, a content screen 1620, a save button 1630, and a file drawer 1640. A title screen 1610 is an editable field wherein a title to a document may be entered. A content screen 1620 is an editable field wherein text to a document may be entered and viewed by a user. In an embodiment, text is entered into the content screen 1620 by manual entry by the user through a keyboard. In another embodiment, the user may enter text into the content screen 1620 by speaking into a microphone. In this embodiment, the memo pad portlet 1600 may comprise voice recognition software such that input recorded by the microphone associated with the user is transferred into text, which is subsequently displayed in the content screen 1620. In such an embodiment, the web browser should be configured such that it comprises voice recognition software to enable it to translate audio information received from the microphone into text.

Figure 17:
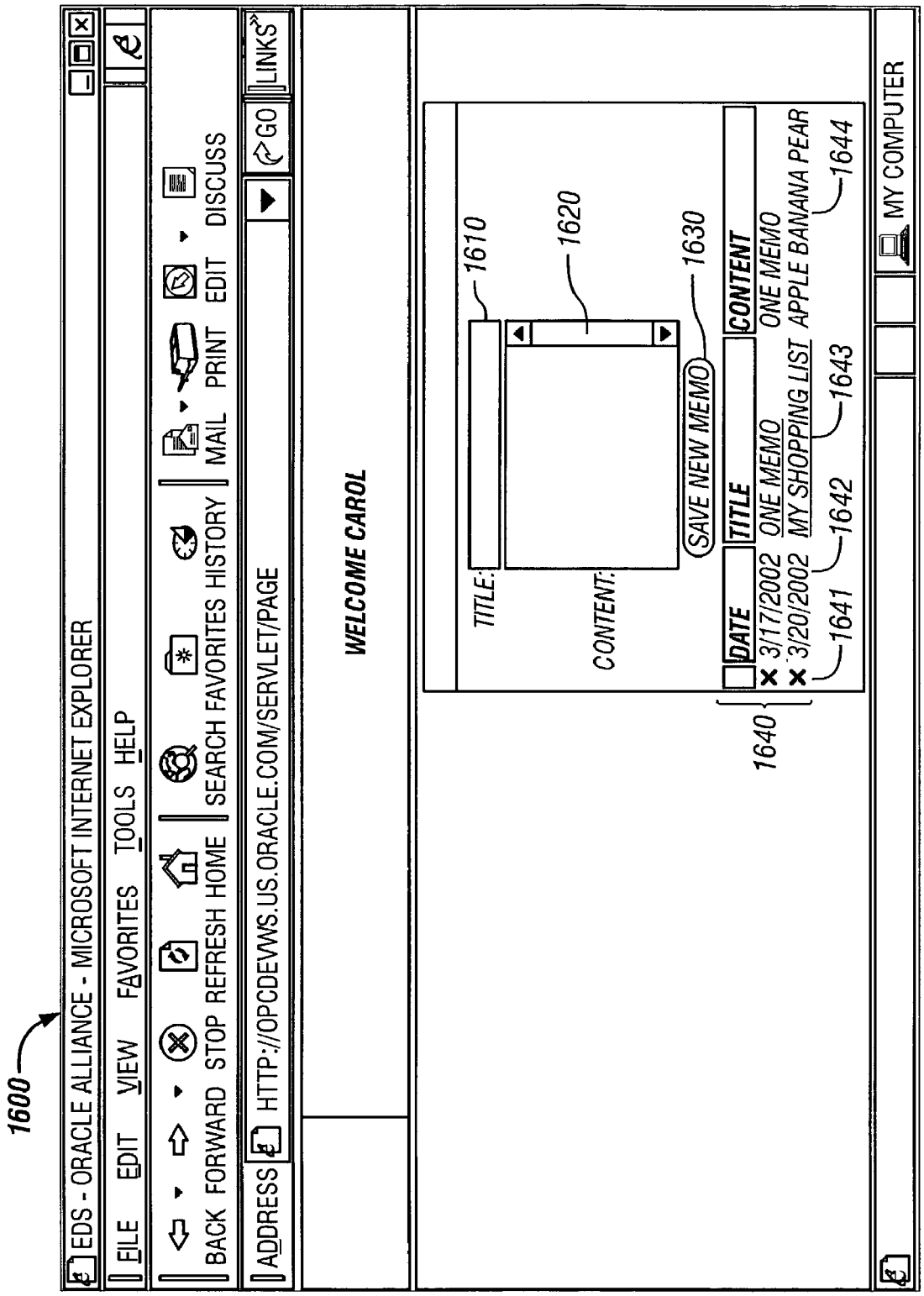
FIG. 17 is a graphical depiction of a memo pad portlet 1600 after a document is saved according to an embodiment of the invention.

In an embodiment, the save button 1630 saves the current document displayed in the content screen 1620. The saved document is stored at a database associated with a web provider 120 supporting the memo pad portlet 1600. FIG. 17 graphically depicts a memo pad portlet 1600 after a document is saved according to an embodiment of the invention. As shown in FIG. 17, the name of the saved document appears in the file drawer 1640. The file drawer 1640 lists all the documents created by the user. In an embodiment, the file drawer may automatically determine the identity of the user, and thus, which documents to show, by information transmitted by the application server 110 to the web provider 120 supporting the memo pad portlet 1600. For each document in the file drawer 1640, the file drawer 1640 displays the title of the document 1643, the content of the document 1644, the creation date of the document 1642, and provides a deletion means 1641. If a user clicks on a particular deletion means 1641 associated with a document, then the user will delete that document.

Figure 18:
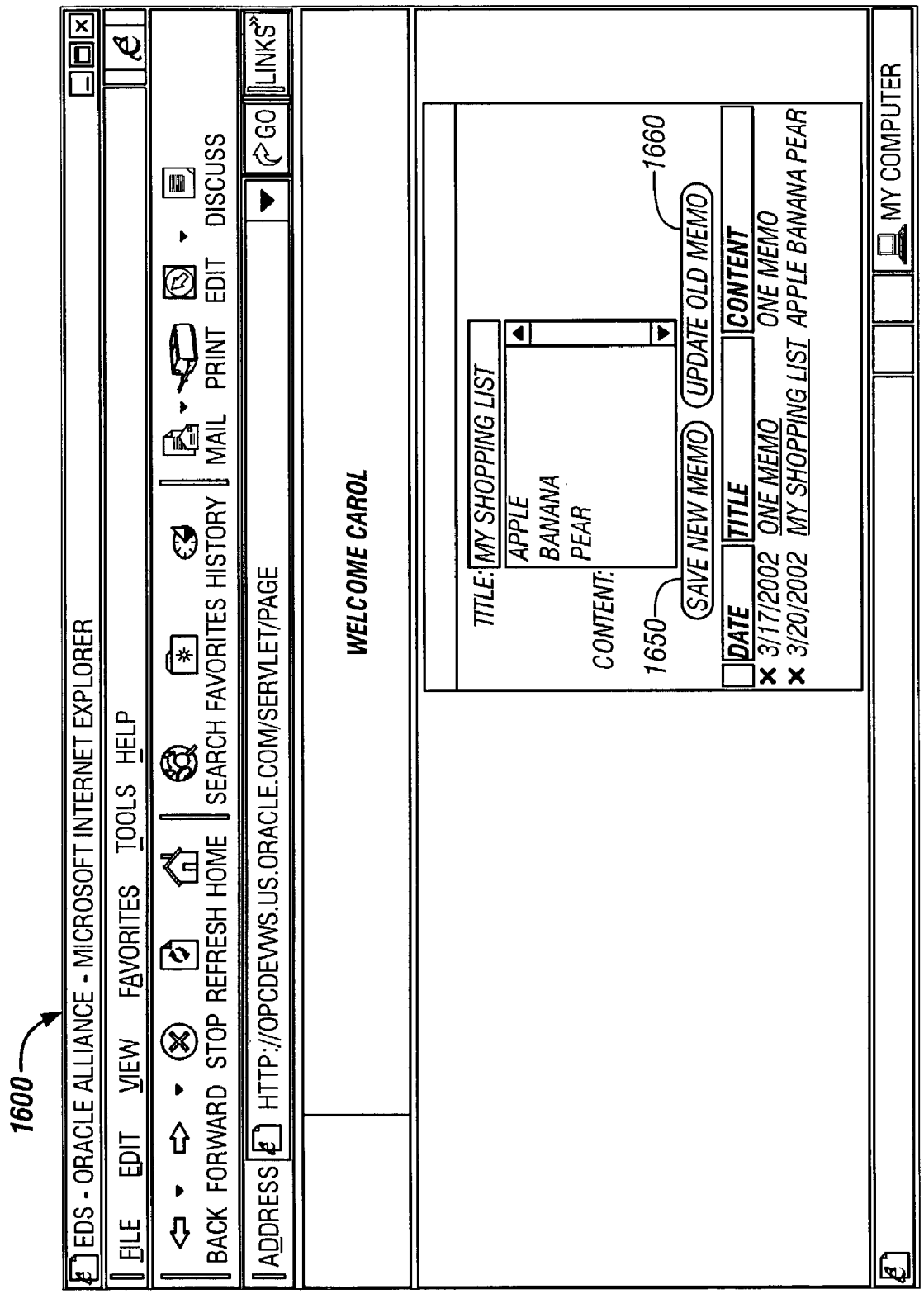
FIG. 18 is a graphical depiction of a the memo pad portlet 1600 after a document is loaded according to an embodiment of the invention.

Documents may be loaded from the file drawer 1640 to the memo pad portlet 1600. In an embodiment, by clicking the name of the document in the file drawer 1640, the document will be loaded in the memo pad portlet 1600, as shown in FIG. 18, which illustrates the state of the memo pad portlet 1600 if the document entitled "My Shopping List" were loaded. Note that the document may be edited or revised, and subsequently a new document may be saved by clicking the "save new memo" button 1650, or the old document may be updated by clicking the "update old memo" button 1660.

VI. Deployment Considerations

The execution of the sequences of instructions required to practice the invention may be performed in embodiments of the invention by a computer system 1900. In an embodiment of the invention, execution of the sequences of instructions required to practice the invention is performed by a single computer system 1900. According to other embodiments of the invention, two or more computer systems 1900 coupled by a communication link 1915 may perform the sequence of instructions required to practice the invention in coordination with one another. In order to avoid needlessly obscuring the invention, a description of only one computer system 1900 will be presented below; however, it should be understood that any number of computer systems 1900 may be employed to practice the invention.

A computer system 1900 according to an embodiment of the invention will now be described with reference to FIG. 19, which is a block diagram of the functional components of a computer system 1900 according to an embodiment of the invention. As used herein, the term computer system 1900 is broadly used to describe any computing device that can store and independently run one or more programs.

Each computer system 1900 may include a communication interface 1914 coupled to the bus 1906. The communication interface 1914 provides two-way communication between computer systems 1900. The communication interface 1914 of a respective computer system 1900 transmits and receives electrical, electromagnetic or optical signals, that include data streams representing various types of signal information, e.g., instructions, messages and data. A communication link 1915 links one computer system 1900 with another computer system 1900. For example, the communication link 1915 may be a LAN, in which case the communication interface 1914 may be a LAN card, or the communication link 1915 may be a PSTN, in which case the communication interface 1914 may be an integrated services digital network (ISDN) card or a modem.

A computer system 1900 may transmit and receive messages, data, and instructions, including program, i.e., application, code, through its respective communication link 1915 and communication interface 1914. Received program code may be executed by the respective processor(s) 1907 as it is received, and/or stored in the storage device 1910, or other associated non-volatile media, for later execution.

In an embodiment, the computer system 1900 operates in conjunction with a data storage system 1931, e.g., a data storage system 1931 that contains a database 1932 that is readily accessible by the computer system 1900. The computer system 1900 communicates with the data storage system 1931 through a data interface 1933. A data interface 1933, which is coupled to the bus 1906, transmits and receives electrical, electromagnetic or optical signals, that include data streams representing various types of signal information, e.g., instructions, messages and data. In embodiments of the invention, the functions of the data interface 1933 may be performed by the communication interface 1914.

Computer system 1900 includes a bus 1906 or other communication mechanism for communicating instructions, messages and data, collectively, information, and one or more processors 1907 coupled with the bus 1906 for processing information. Computer system 1900 also includes a main memory 1908, such as a random access memory (RAM) or other dynamic storage device, coupled to the bus 1906 for storing dynamic data and instructions to be executed by the processor(s) 1907. The main memory 1908 also may be used for storing temporary data, i.e., variables, or other intermediate information during execution of instructions by the processor(s) 1907.

The computer system 1900 may further include a read only memory (ROM) 1909 or other static storage device coupled to the bus 1906 for storing static data and instructions for the processor(s) 1907. A storage device 1910, such as a magnetic disk or optical disk, may also be provided and coupled to the bus 1906 for storing data and instructions for the processor(s) 1907.

A computer system 1900 may be coupled via the bus 1906 to a display device 1911, such as, but not limited to, a cathode ray tube (CRT), for displaying information to a user. An input device 1912, e.g., alphanumeric and other keys, is coupled to the bus 1906 for communicating information and command selections to the processor(s) 1907.

According to one embodiment of the invention, an individual computer system 1900 performs specific operations by their respective processor(s) 1907 executing one or more sequences of one or more instructions contained in the main memory 1908. Such instructions may be read into the main memory 1908 from another computer-usable medium, such as the ROM 1909 or the storage device 1910. Execution of the sequences of instructions contained in the main memory 1908 causes the processor(s) 1907 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1907. Such a medium may take many forms, including, but not limited to, non-volatile, volatile and transmission media. Non-volatile media, i.e., media that can retain information in the absence of power, includes the ROM 1909, CD ROM, magnetic tape, and magnetic discs. Volatile media, i.e., media that can not retain information in the absence of power, includes the main memory 1908. Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for providing access to a discussion forum over a computer network, comprising:
    configuring a web provider to support a discussion forum portlet;
    receiving a first request for a web page from a user, the web page comprising the discussion forum portlet, the discussion forum portlet hosting at least one of the one or more discussion forums, wherein the at least one of the one or more discussion forums comprises restricting access through a password, a moderator alias, and at least one of a Frequently Asked Questions (FAQ) link or announcements for a specified duration;
    identifying the web provider at an application server based on the request;
    transmitting a second request to the web provider for content;
    parsing the second request at the web provider;
    checking, at the web provider, one or more central repositories to determine whether the content exists;
    fulfilling the second request with the content at the web provider;
    transmitting the information satisfying the second request from the web provider to the application server to be assembled in response to the first request for content by using information about the structure, appearance and operation of requested web page and the information obtained from the web provider;
    obtaining the content to be displayed in the discussion forum portlet from the web provider;
    assembling the requested web page at the application server, wherein the application server retrieves information about the structure, appearance, and operation of the web page from a database and thereafter composes the web page with the information and the content from the web provider and the database; and
    transmitting the web page to the user.

2. The method of claim 1, wherein the discussion forum portlet was created by an admin discussion forum portlet.

3. The method of claim 1, wherein the web page is transmitted over a wireless network to the user.

4. A method for providing access to a notice board over a computer network, comprising:
    configuring a web provider to support a notice board portlet;
    receiving a first request for a web page from a user, the web page comprising the notice board portlet, wherein the notice board comprises restricting access by users, a user alias, and notice to a group for a specified duration;
    identifying the web provider at an application server based on the request;
    transmitting a second request to the web provider for content;
    parsing the second request at the web provider;
    checking, at the web provider, one or more central repositories to determine whether the content exists;
    fulfilling the second request with the content at the web provider;
    transmitting the information satisfying the second request from the web provider to the application server to be assembled in response to the first request for content by using information about the structure, appearance and operation of requested web page and the information obtained from the web provider;
    obtaining the content to be displayed in the notice board portlet from the web provider;
    assembling the requested web page at the application server, wherein the application server retrieves information about the structure, appearance, and operation of the web page from a database and thereafter composes the web page with the information and the content from the web provider and the database; and
    transmitting the web page to the user.

5. The method of claim 4, wherein the notice board portlet is configured such that a list of notices is displayed to the user, the list of notices comprising the date of posting, the name of the person posting the notice, the name of the intended recipient, and the subject of the notice.

6. The method of claim 4, wherein the web page is transmitted over a wireless network to the user.

7. A method for providing access to a memo pad over a computer network, comprising:
    configuring a web provider to support a memo pad portlet;
    receiving a first request for a web page from a user, the web page comprising the memo pad portlet, wherein the memo pad portlet comprises restricting access by the identity of the user, a content screen, and a listing of one or more documents created by the user for a specified duration;
    identifying the web provider at an application server based on the request;

transmitting a second request to the web provider for content;
parsing the second request at the web provider;
checking, at the web provider, one or more central repositories to determine whether the content exists;
fulfilling the second request with the content at the web provider;
transmitting the information satisfying the second request from the web provider to the application server to be assembled in response to the first request for content by using information about the structure, appearance and operation of requested web page and the information obtained from the web provider;
obtaining the content to be displayed in the memo pad portlet from the web provider;
assembling the requested web page at the application server, wherein the application server retrieves information about the structure, appearance, and operation of the web page from a database and thereafter composes the web page with the information and the content from the web provider and database; and
transmitting the web page to the user.

8. The method of claim 7, further comprising:
receiving a document composed in the memo pad portlet; and
storing the document at the web provider.

9. The method of claim 8, wherein the document is composed using voice recognition software.

10. A computer readable storage medium carrying one or more sequences of instructions for providing access to a discussion forum over a computer network, wherein execution of the one or more sequences of instructions by one or more processors causes the one or more processors to:
configure a web provider to support a discussion forum portlet;
receive a first request for a web page from a user, the web page comprising the discussion forum portlet, the discussion forum portlet hosting at least one of the one or more discussion forums, wherein the at least one of the one or more discussion forums comprises restricting access through a password, a moderator alias, and at least one of a Frequently Asked Questions (FAQ) link or announcements for a specified duration;
identify the web provider at an application server based on the request;
transmit a second request to the web provider for content;
parse the second request at the web provider;
check, at the web provider, one or more central repositories to determine whether the content exists;
fulfill the second request with the content at the web provider;
transmit the information satisfying the second request from the web provider to the application server to be assembled in response to the first request for content by using information about the structure appearance and operation of requested web page and the information obtained from the web provider;
obtain the content to be displayed in the discussion forum portlet from the web provider;
assemble the requested web page at the application server, wherein the application server retrieves information about the structure, appearance, and operation of the web page from a database and thereafter composes the web page with the information and the content from the web provider and the database; and
transmit the web page to the user.

11. The computer-readable storage medium of claim 10, wherein the discussion forum portlet was created by an admin discussion forum portlet.

12. The computer-readable storage medium of claim 10, wherein the web page is transmitted over a wireless network to the user.

13. A computer-readable storage medium carrying one or more sequences of instructions for providing access to a notice board over a computer network, wherein execution of the one or more sequences of instructions by one or more processors causes the one or more processors to:
configure a web provider to support a notice board portlet;
receive a first request for a web page from a user, the web page comprising the notice board portlet, wherein the notice board comprises restricting access by users, a user alias, and notice to a group for a specified duration;
identify the web provider at an application server based on the request;
transmit a second request to the web provider for content;
parse the second request at the web provider;
check, at the web provider, one or more central repositories to determine whether the content exists;
fulfill the second request with the content at the web provider;
transmit the information satisfying the second request from the web provider to the application server to be assembled in response to the first request for content by using information about the structure, appearance and operation of requested web page and the information obtained from the web provider;
obtain the content to be displayed in the notice board portlet from the web provider;
assemble the requested web page at the application server, wherein the application server retrieves information about the structure, appearance, and operation of the web page from a database and thereafter composes the web page with the information and the content from the web provider and database; and
transmit the web page to the user.

14. The computer-readable storage medium of claim 13, wherein the notice board portlet is configured such that a list of notices is displayed to the user, the list of notices comprising the date of posting, the name of the person posting the notice, the name of the intended recipient, and the subject of the notice.

15. The computer-readable storage medium of claim 13, wherein the web page is transmitted over a wireless network to the user.

16. A computer-readable storage medium carrying one or more sequences of instructions for providing access to a memo pad over a computer network, wherein execution of the one or more sequences of instructions by one or more processors causes the one or more processors to:
configure a web provider to support a memo pad portlet;
receive a first request for a web page from a user, the web page comprising the memo pad portlet, wherein the memo pad portlet comprises restricting access by the identity of the user, a content screen, and a listing of one or more documents created by the user for a specified duration;
identify the web provider at an application server based on the request;
transmit a second request to the web provider for content;
parse the second request at the web provider;
check, at the web provider, one or more central repositories to determine whether the content exists;

fulfill the second request with the content at the web provider;

transmit the information satisfying the second request from the web provider to the application server to be assembled in response to the first request for content by using information about the structure, appearance and operation of requested web page and the information obtained from the web provider;

obtain the content to be displayed in the memo pad portlet from the web provider;

assemble the requested web page at the application server, wherein the application server retrieves information about the structure, appearance, and operation of the web page from a database and thereafter composes the web page with the information and the content from the web provider and database; and transmit the web page to the user.

17. The computer-readable storage medium of claim 16, further comprising:

receiving a document composed in the memo pad portlet; and storing the document at the web provider.

18. The computer-readable storage medium of claim 17, wherein the document is composed using voice recognition software.

19. The computer-readable storage medium of claim 16, wherein the web page is transmitted over a wireless network to the user.

* * * * *

UNITED STATES PATENT AND TRADEMARK OFFICE
CERTIFICATE OF CORRECTION

| | | |
|---|---|---|
| PATENT NO. | : 7,548,957 B1 | Page 1 of 1 |
| APPLICATION NO. | : 10/141583 | |
| DATED | : June 16, 2009 | |
| INVENTOR(S) | : Derek Wichmann | |

It is certified that error appears in the above-identified patent and that said Letters Patent is hereby corrected as shown below:

On page 2, in column 1, under "U.S. Patent Documents", line 61, delete "A9" and insert -- A1 --, therefor.

On page 2, in column 2, under "Other Publications", line 43, delete "Stragegy" and insert -- Strategy --, therefor.

On sheet 14 of 19 in Figure 14, line 4, below "LOGOUT" delete "CALENDER" and insert -- CALENDAR --, therefor.

On sheet 15 of 19, in Figure 15, line 4, below "LOGOUT" delete "CALENDER" and insert -- CALENDAR --, therefor.

Figure 19:
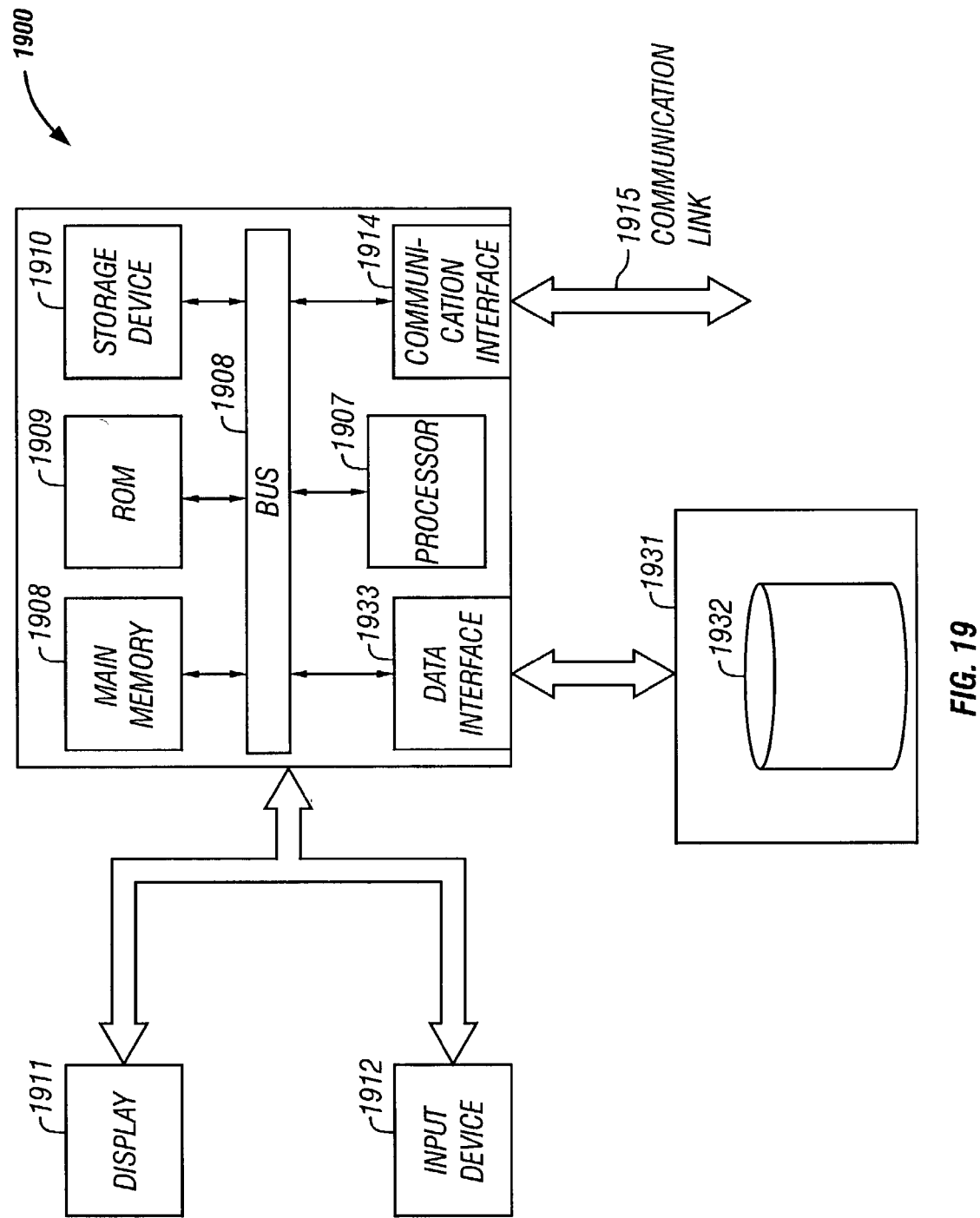
FIG. 19 is a graphical depiction of a computer system 1900 according to an embodiment of the invention.

On sheet 19 of 19, in Figure 19, line 4, in the numerical label identifying "BUS" delete "1908" and insert -- 1906 --, therefor.

In column 4, line 5-6, delete "9iApplication" and insert -- 9i Application --, therefor.

In column 4, line 48, delete "8idatabase," and insert -- 8i database, --, therefor.

In column 4, line 1, delete "8idatabase" and insert -- 8i database --, therefor.

In column 6, line 44-45, delete "updated-information" and insert -- updated information --, therefor.

In column 7, line 66, delete "forum'" and insert -- forum --, therefor.

In column 8, line 12, delete "enabled," and insert -- enabled; --, therefor.

Signed and Sealed this

Fifteenth Day of June, 2010

David J. Kappos
*Director of the United States Patent and Trademark Office*